United States Patent
Edwards et al.

(10) Patent No.: US 9,258,289 B2
(45) Date of Patent: Feb. 9, 2016

(54) AUTHENTICATION OF IP SOURCE ADDRESSES

(71) Applicants: Jeffrey Edwards, Grass Lake, MI (US); Jose Oscar Nazario, Ann Arbor, MI (US)

(72) Inventors: Jeffrey Edwards, Grass Lake, MI (US); Jose Oscar Nazario, Ann Arbor, MI (US)

(73) Assignee: Arbor Networks

( * ) Notice: Subject to any disclaimer, the term of this patent is extended or adjusted under 35 U.S.C. 154(b) by 247 days.

(21) Appl. No.: 13/872,824

(22) Filed: Apr. 29, 2013

(65) Prior Publication Data

US 2014/0325596 A1   Oct. 30, 2014

(51) Int. Cl.
*H04L 29/06* (2006.01)
*H04W 12/06* (2009.01)
*G06F 17/30* (2006.01)

(52) U.S. Cl.
CPC ............ *H04L 63/08* (2013.01); *H04L 63/1458* (2013.01); *H04W 12/06* (2013.01); *G06F 17/30864* (2013.01); *H04L 63/168* (2013.01)

(58) Field of Classification Search
None
See application file for complete search history.

(56) References Cited

U.S. PATENT DOCUMENTS

| | | | | |
|---|---|---|---|---|
| 7,854,001 B1 * | 12/2010 | Chen et al. | | 726/22 |
| 7,984,304 B1 * | 7/2011 | Waldspurger et al. | | 713/187 |
| 8,244,799 B1 * | 8/2012 | Salusky et al. | | 709/203 |
| 8,595,846 B1 * | 11/2013 | Etheredge et al. | | 726/26 |
| 8,613,089 B1 * | 12/2013 | Holloway et al. | | 726/23 |
| 8,621,638 B2 * | 12/2013 | Judge et al. | | 726/25 |
| 8,631,489 B2 * | 1/2014 | Antonakakis et al. | | 726/22 |
| 8,661,522 B2 * | 2/2014 | Huston et al. | | 726/13 |
| 8,726,379 B1 * | 5/2014 | Stiansen | H04L 63/1441 | 726/22 |
| 2006/0069697 A1 * | 3/2006 | Shraim | | H04L 12/585 |
| 2007/0294762 A1 * | 12/2007 | Shraim | H04L 12/585 | 726/22 |
| 2008/0034211 A1 * | 2/2008 | Shull | H04L 29/12066 | 713/175 |
| 2008/0082662 A1 * | 4/2008 | Dandliker | H04L 63/10 | 709/225 |
| 2008/0256622 A1 * | 10/2008 | Neystadt | H04L 63/1416 | 726/14 |
| 2009/0064332 A1 * | 3/2009 | Porras | H04L 63/101 | 726/23 |
| 2010/0235915 A1 * | 9/2010 | Memon | H04L 63/145 | 726/23 |
| 2011/0252472 A1 * | 10/2011 | Ehrlich et al. | | 726/22 |
| 2012/0054869 A1 * | 3/2012 | Yen et al. | | 726/24 |
| 2012/0096553 A1 * | 4/2012 | Srivastava | G06F 21/56 | 726/24 |
| 2012/0117239 A1 * | 5/2012 | Holloway | H04L 61/1511 | 709/226 |
| 2012/0117254 A1 * | 5/2012 | Ehrlich et al. | | 709/228 |
| 2012/0191855 A1 * | 7/2012 | Alexander | | 709/225 |
| 2012/0272331 A1 * | 10/2012 | Lemaster | H04L 63/0236 | 726/27 |
| 2013/0031605 A1 * | 1/2013 | Huston, III et al. | | 726/3 |
| 2013/0246643 A1 * | 9/2013 | Luby et al. | | 709/231 |
| 2013/0290697 A1 * | 10/2013 | Wang et al. | | 713/150 |

OTHER PUBLICATIONS

Jacob, G., Kirda, E., Kruegel, C., Vigna, G.; "PubCrawl: Protecting Users and Businesses form CRAWLers"; USENIX Security Symposium, 2012.*

(Continued)

*Primary Examiner* — Andrew Nalven
*Assistant Examiner* — Christopher Ruprecht
(74) *Attorney, Agent, or Firm* — Locke Lord LLP; Scott D. Wofsy; Christopher J. Capelli

(57) ABSTRACT

A method and system for authenticating IP source addresses by accessing one or more HTTP requests whose source client identifies itself as a legitimate web crawler. One or more IP addresses are detected from the one or more HTTP requests and each detected IP address is authenticated via a probability estimation regarding its association with a legitimate web crawler. A lookup table is preferably compiled for the authenticated IP addresses for reference, publication and authentication purposes.

18 Claims, 3 Drawing Sheets

(56) References Cited

OTHER PUBLICATIONS

Collins, M., Shimeall, T., Faber, S., Janies, J., Weaver, R. De Shon, M.; "Predicting future botnet addresses with uncleanliness"; Proc. of IMC. CERT Network Situational Awareness Group, 2007.*

John, J. et al., "Heat-seeking Honeypots: Design and Experience," WWW 2011, Mar. 28-Apr. 1, 2011, Hyderabad, India.*

Wilson, C. et al., "Don't Tread on Me: Moderating Access to OSN Data with SpikeStrip," Proceedings of the 3rd ACM SIGCOMM Workshop on Social Networks (WOSN'10). 2010.*

\* cited by examiner

AUTHENTICATION OF IP SOURCE ADDRESSES

FIELD OF THE INVENTION

The present invention relates to communication networks, and more specifically, to network management techniques for detecting spoofed web crawler requests.

BACKGROUND OF THE INVENTION

With advances in integrated circuit, microprocessor, networking and communication technologies, increasing numbers of devices, in particular, digital computing devices, are being networked together. Devices are often first coupled to a local area network, such as an Ethernet based office/home network. In turn, local area networks are interconnected together through wide area networks, such as ATM networks, Frame Relays, and the like. Of particular interest is the TCP/IP based global inter-networks—the Internet.

As a result of this trend of increased connectivity, increasing numbers of applications that are network dependent are being deployed. Examples of these network dependent applications include but are not limited to, email, net-based telephony, world wide web and various types of e-commerce. For these applications, success inherently means a high volume of desirable network traffic for their implementing servers. To ensure continuing success, quality of service through orderly and efficient handling of the large volume of desirable network traffic has become of paramount importance. Various subject matters, such as scalability, distributive deployment and caching of contents as well as regulating network traffic destined for a network node, have become of great interest.

Unfortunately, success also may mean attracting undesirable network traffic designed to disrupt or completely shut down the services offered by the implementing servers. To ensure continuing success, the ability to fend off undesirable network traffic, also known as fending off denial of service (DoS) attacks, has also become of great importance. Various subject matters, including detection and filtering of packets with spoofed web crawler requests, have too become of great interest.

However, to-date, there are limited approaches for detecting and filtering out packets with spoofed web crawler requests. Thus it is desirable to optimize spoofed web crawler detection and filtering techniques.

SUMMARY OF THE INVENTION

The purpose and advantages of the invention will be set forth in and apparent from the description that follows. Additional advantages of the invention will be realized and attained by the devices, systems and methods particularly pointed out in the written description and claims hereof, as well as from the appended drawings.

To achieve these and other advantages, and in accordance with the purposes of the below illustrated embodiments, in one aspect, a system and method for authenticating IP source addresses preferably being used by legitimate web crawlers is described. An aspect includes accessing one or more HTTP requests that claim to be generated by a legitimate web crawler. One or more IP addresses are detected from the one or more HTTP requests and each detected IP address is authenticated by associating it with a probability estimation regarding its association with a legitimate web crawler. A lookup table is preferably compiled for the authenticated IP addresses for reference, publication and authentication purposes.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
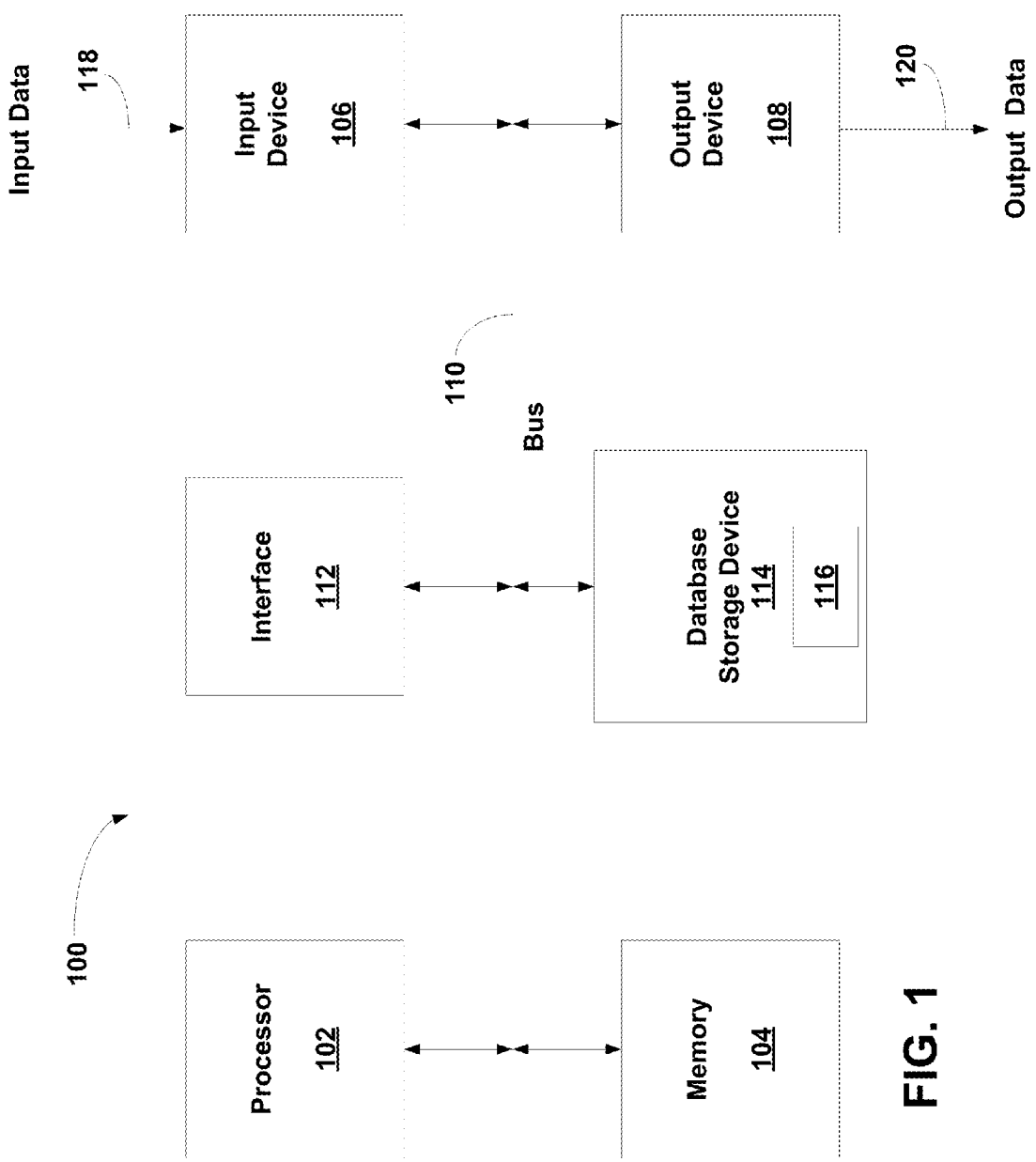
FIG. 1 illustrates a system overview of a computer system utilized in the certain illustrated embodiments.

The present invention is now described more fully with reference to the accompanying drawings, in which an illustrated embodiment of the present invention is shown. The present invention is not limited in any way to the illustrated embodiment as the illustrated embodiment described below is merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

Turning now descriptively to the drawings, in which similar reference characters denote similar elements throughout the several views, FIG. 1 depicts an exemplary general-purpose computing system in which illustrated embodiments of the present invention may be implemented. A generalized computering embodiment in which the present invention can be realized is depicted in FIG. 1 illustrating a processing system 100 which generally comprises at least one processor 102, or processing unit or plurality of processors, memory 104, at least one input device 106 and at least one output device 108, coupled together via a bus or group of buses 110. In certain embodiments, input device 106 and output device 108 could be the same device. An interface 112 can also be provided for coupling the processing system 100 to one or more peripheral devices, for example interface 112 could be a PCI card or PC card. At least one storage device 114 which houses at least one database 116 can also be provided. The memory 104 can be any form of memory device, for example, volatile or non-volatile memory, solid state storage devices, magnetic devices, etc. The processor 102 could comprise more than one distinct processing device, for example to handle different functions within the processing system 100. Input device 106 receives input data 118 and can comprise, for example, a keyboard, a pointer device such as a pen-like device or a mouse, audio receiving device for voice controlled activation such as a microphone, data receiver or antenna such as a modem or wireless data adaptor, data acquisition card, etc. Input data 118 could come from different sources, for example keyboard instructions in conjunction with data received via a network. Output device 108 produces or generates output data 120 and can comprise, for example, a display device or monitor in which case output data 120 is visual, a printer in which case output data 120 is printed, a port for example a USB port, a peripheral component adaptor, a data transmitter or antenna such as a modem or wireless network adaptor, etc. Output data 120 could be distinct and derived from different output devices, for example a visual display on a monitor in conjunction with data transmitted to a network. A user could view data output, or an interpretation of the data output, on, for example, a monitor or using a printer. The storage device 114 can be any form of data or information storage means, for example, volatile or non-volatile memory, solid state storage devices, magnetic devices, etc.

In use, the processing system 100 is adapted to allow data or information to be stored in and/or retrieved from, via wired or wireless communication means, at least one database 116. The interface 112 may allow wired and/or wireless communication between the processing unit 102 and peripheral components that may serve a specialized purpose. Preferably, the processor 102 receives instructions as input data 118 via input device 106 and can display processed results or other output to a user by utilizing output device 108. More than one input device 106 and/or output device 108 can be provided. It should be appreciated that the processing system 100 may be any form of terminal, server, specialized hardware, or the like.

It is to be appreciated that the processing system 100 may be a part of a networked communications system. Processing system 100 could connect to a network, for example the Internet or a WAN. Input data 118 and output data 120 could be communicated to other devices via the network. The transfer of information and/or data over the network can be achieved using wired communications means or wireless communications means. A server can facilitate the transfer of data between the network and one or more databases. A server and one or more databases provide an example of an information source.

Thus, the processing computing system environment 100 illustrated in FIG. 1 may operate in a networked environment using logical connections to one or more remote computers. The remote computer may be a personal computer, a server, a router, a network PC, a peer device, or other common network node, and typically includes many or all of the elements described above.

It is to be further appreciated that the logical connections depicted in FIG. 1 include a local area network (LAN) and a wide area network (WAN), but may also include other networks such as a personal area network (PAN). Such networking environments are commonplace in offices, enterprise-wide computer networks, intranets, and the Internet. For instance, when used in a LAN networking environment, the computing system environment 100 is connected to the LAN through a network interface or adapter. When used in a WAN networking environment, the computing system environment typically includes a modem or other means for establishing communications over the WAN, such as the Internet. The modem, which may be internal or external, may be connected to a system bus via a user input interface, or via another appropriate mechanism. In a networked environment, program modules depicted relative to the computing system environment 100, or portions thereof, may be stored in a remote memory storage device. It is to be appreciated that the illustrated network connections of FIG. 1 are exemplary and other means of establishing a communications link between multiple computers may be used.

FIG. 1 is intended to provide a brief, general description of an illustrative and/or suitable exemplary environment in which embodiments of the below described present invention may be implemented. FIG. 1 is an example of a suitable environment and is not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

In the description that follows, certain embodiments may be described with reference to acts and symbolic representations of operations that are performed by one or more computing devices, such as the computing system environment 100 of FIG. 1. As such, it will be understood that such acts and operations, which are at times referred to as being computer-executed, include the manipulation by the processor of the computer of electrical signals representing data in a structured form. This manipulation transforms the data or maintains them at locations in the memory system of the computer, which reconfigures or otherwise alters the operation of the computer in a manner understood by those skilled in the art. The data structures in which data is maintained are physical locations of the memory that have particular properties defined by the format of the data. However, while an embodiment is being described in the foregoing context, it is not meant to be limiting as those of skill in the art will appreciate that the acts and operations described hereinafter may also be implemented in hardware.

Embodiments may be implemented with numerous other general-purpose or special-purpose computing devices and computing system environments or configurations. Examples of well-known computing systems, environments, and configurations that may be suitable for use with an embodiment include, but are not limited to, personal computers, handheld or laptop devices, personal digital assistants, tablet devices, smart phone devices, multiprocessor systems, microprocessor-based systems, set top boxes, programmable consumer electronics, network, minicomputers, server computers, game server computers, web server computers, mainframe computers, and distributed computing environments that include any of the above systems or devices.

Embodiments may be described in a general context of computer-executable instructions, such as program modules, being executed by a computer. Generally, program modules include routines, programs, objects, components, data structures, etc., that perform particular tasks or implement particular abstract data types. An embodiment may also be practiced in a distributed computing environment where tasks are performed by remote processing devices that are linked through a communications network. In a distributed computing environment, program modules may be located in both local and remote computer storage media including memory storage devices.

Figure 2:
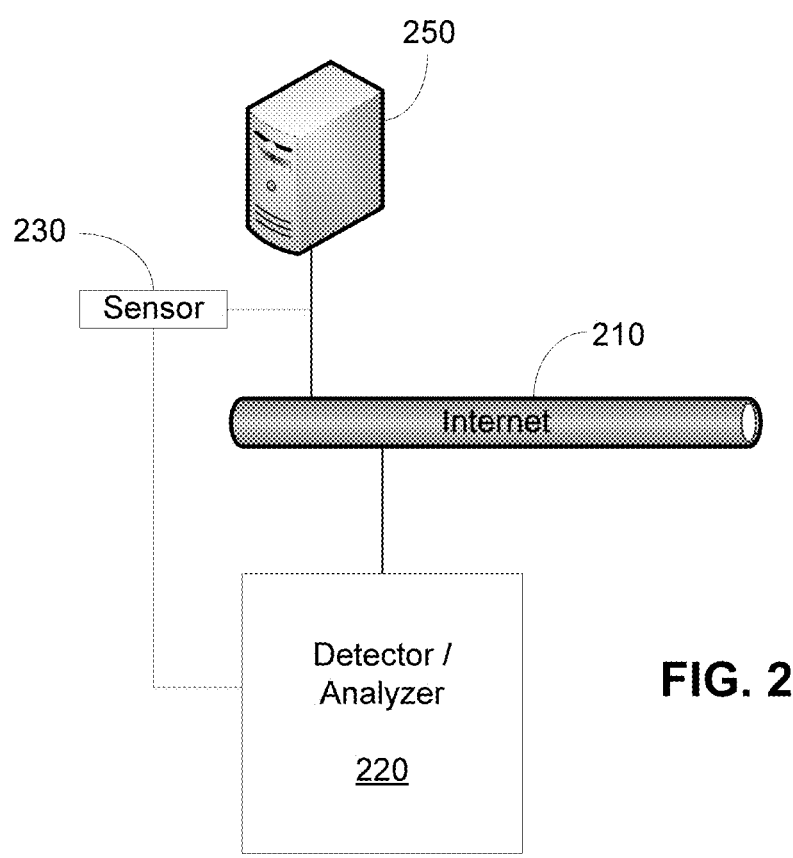
FIG. 2 illustrates a network view of a certain illustrated embodiment.

With the exemplary computing system environment 100 of FIG. 1 being generally shown and discussed above, depicted in FIG. 2 is a generalized diagram of a system (referenced generally by numeral 200) for performing the below illustrated techniques of the present invention, which may be utilized with system 100, or components thereof. It is to be understood the present invention is not be limited to what is shown in FIG. 2, as it is to be utilized in any system, apparatus and/or device coupled to a network for receiving samples of web traffic to preferably identify possible blocks of source IP addresses associated with legitimate search engine crawlers (via filtering spoofed requests) and to further preferably compile authenticated IP blocks which are regularly published in accordance with an illustrated embodiment. For instance, an illustrated use of the illustrated system and process described herein is with the PRAVAIL™ Availability Protection System (PRAVAIL™ APS) from Arbor® Networks. PRAVAIL™ APS is a network security product configured and adapted for generally preventing DDoS attacks and availability threats that affect data centers and enterprise networks. PRAVAIL™ APS may be deployed by network/data center operators in front of services to stop application-layer attacks. PRAVAIL™ APS may further be integrated upstream in a network/data center to preferably thwart volumetric DDoS attacks. Features of PRAVAIL™ APS include (but are not limited to): detecting and blocking emerging application-layer DDoS attacks; and deploy a turnkey solution to thwart DDoS threats; accelerate responses to DDoS attacks to prevent disruption of legitimate services.

System 200 generally includes an analyzing apparatus 220 coupled to one or more sensor devices 230 coupled to the Internet 210. It is to be understood and appreciated the analyzing apparatus 220 and each of the one or more sensor devices 230 includes the above described system 100, or components therefore, to perform the below described functionality in accordance with an illustrated embodiment for detecting legitimate search engine crawlers and compiling authenticated IP blocks associated with legitimate search engine crawlers. It is to be further understood and appreciated analyzing apparatus 220 and a sensor device 230 may be separate components (as illustrated) or may be integrated in one single component.

Preferably, each sensor 230 is a passive device for acquiring samples of IP traffic (e.g., IP traffic to a webserver 250) for input into analyzing apparatus 220 for performance of an illustrated embodiment as discussed in conjunction with FIG. 3 below.

Figure 3:
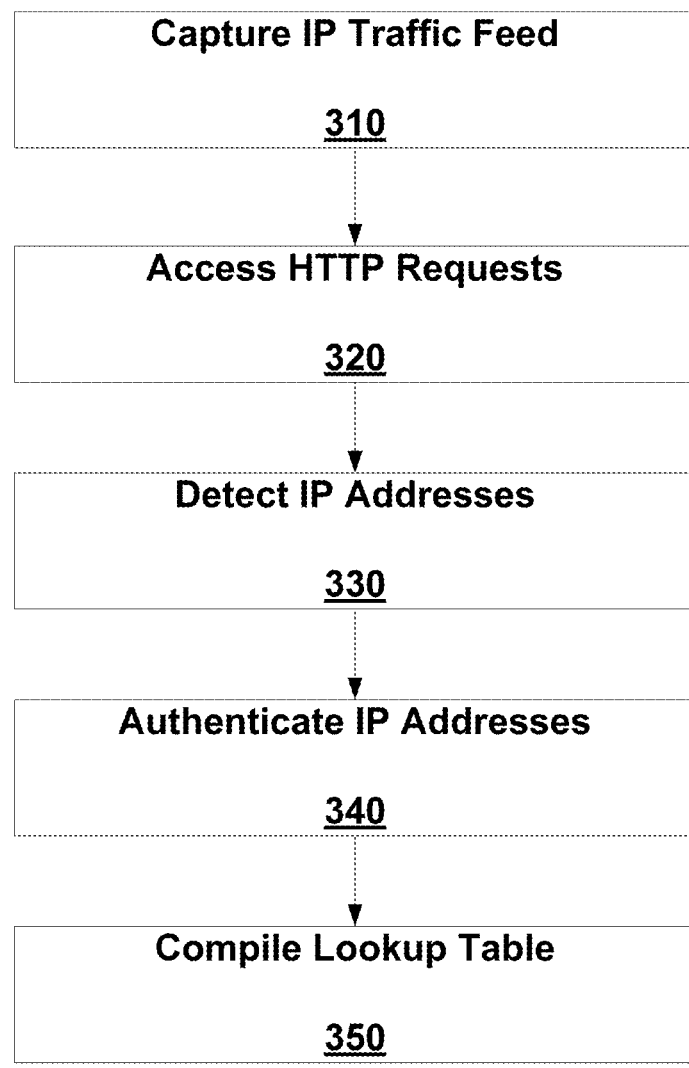
FIG. 3 depicts a method utilized with the illustrated embodiment of FIG. 2.

With reference now to FIG. 3, shown is a flow chart demonstrating implementation of the various exemplary embodiments of the present invention technique for detecting legitimate search engine crawlers and compiling authenticated IP blocks associated with legitimate search engine crawlers. It is noted that the order of steps shown in FIG. 3 is not required, so in principle, the various steps may be performed out of the illustrated order. Also certain steps may be skipped, different steps may be added or substituted, or selected steps or groups of steps may be performed in a separate application following the embodiments described herein.

Starting at step 310, the preferably one or more internet sensors (230) capture samples of web requests from the Internet (210) for preferably accessing one or more HTTP requests from one or more clients that identify themselves as a web crawler. For purposes of the present invention, a web crawler is understood to include an internet bot that systematically browses the Internet (210), typically for the purpose of web indexing for search engines such as GOOGLE™, YAHOO™, BING™, etc. A web crawler may also be known as a web spider, an ant or an automatic indexer. Web search engines and some other sites use web crawling or spidering software to update their web content or indexes of others sites' web content. Web crawlers can copy all the pages they visit for later processing by a search engine that indexes the downloaded pages so that a user can search them much more quickly. Web crawlers can also validate hyperlinks and HTML code.

Next, an internet sensor (230)/analyzing apparatus (220) preferably accesses from the captured web requests one or more HTTP requests that claims to be a web crawler, step 320. One or more source IP addresses from the one or more HTTP requests are preferably detected by the internet sensor (230)/analyzing apparatus (220), step 330.

Each detected IP address is then preferably authenticated, preferably via a probability estimation regarding its association with a known legitimate web crawler, step 340. For instance, the probability estimation, includes (and is not to be understood to be limited thereto) if greater than 20% of a particular CIDR block's observed HTTP requests (that claim to be a particular web crawler) are successfully authenticated via round-trip DNS lookups, and at least 60% of that CIDR block's constituent IP addresses have been associated with at least one observed HTTP request claiming to be that particular web crawler, and the CIDR block is of size /24 or larger, then that CIDR block is assigned a high probability of being a source used by the particular legitimate web crawler. It is to be understood, the authentication of each detected IP address in step 340 may further include filtering malicious bots that spoof user agent strings used by legitimate web crawlers and/or the utilization of round-trip Domain Name Server (DNS) lookups. Authentication may additionally include utilization of Autonomous System Number (ASN) queries. As one skilled in the art recognizes, ASN uniquely identifies each network on the Internet. Still further, authentication in step 340 may further include cross-referencing each detected IP address (step 330) against preferably external open sources of crawler logs.

In yet other illustrated embodiments, authentication via step 340 may further preferably include utilization of heuristics based on density of IP addresses in Classless Inter-Domain Routing (CIDR) blocks. For purposes of the illustrated embodiments, CIDR is principally a bitwise, prefix-based standard for the representation of IP addresses and their routing properties. It facilitates routing by allowing blocks of addresses to be grouped into single routing table entries. These groups, commonly called CIDR blocks, share an initial sequence of bits in the binary representation of their IP addresses. IPv4 CIDR blocks are preferably identified using a syntax similar to that of IPv4 addresses: a dotted-decimal address, followed by a slash, then a number from 0 to 32, e.g., a.b.c.d/n. The dotted decimal portion is the IPv4 address. The number following the slash is the prefix length, the number of shared initial bits, counting from the most-significant bit of the address. When emphasizing only the size of a network, the address portion of the notation is usually omitted. Thus, for instance, a /20 block is a CIDR block with an unspecified 20-bit prefix. It is to be further appreciated an IP address is part of a CIDR block, and is said to match the CIDR prefix if the initial n bits of the address and the CIDR prefix are the same. Typically, the length of an IPv4 address is 32 bits, whereby an n-bit CIDR prefix leaves 32-n bits unmatched, meaning that $2^{32-n}$ IPv4 addresses match a given n-bit CIDR prefix. Hence, shorter CIDR prefixes match more addresses, while longer prefixes match fewer. It is noted that an address can match multiple CIDR prefixes of different lengths.

For reference and authentication purposes, a lookup table of each IP address authenticated as a legitimate web crawler (step 340) is then compiled, step 350. The compiling of a lookup table of each authenticated IP address may further include statistically aggregating into CIDR blocks each authenticated IP address in correlation with a confidence score corresponding to an estimation regarding association with a legitimate web crawler. Each CIDR block may be updated having the statistically aggregated IP addresses at prescribed time periods, which may be published by system 200 as real-time, periodically updated feeds.

The above technique may further include the step of determining if an IP address of an HTTP request to a webserver is from a legitimate web crawler by cross referencing the IP address with the compiled lookup table of each authenticated IP address from step 350.

It is to be appreciated and understood, the above described technique 300 with reference to FIG. 3, may preferably be performed periodically (e.g., each evening) whereafter any recommended updates to the above described IP address information feed may be presented to a user operator, via a GUI, preferably accompanied with supporting data, for approval thereof. If approved, changes recommended by system 200/process 300 are preferably pushed to the aforementioned address information feed and published to deployed products utilizing this information.

With the certain illustrated embodiments described above, it is to be understood optional embodiments may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

The above presents a description of a best mode contemplated for carrying out the illustrated embodiments and of the manner and process of making and using them in such full, clear, concise, and exact terms as to enable any person skilled in the art to which it pertains to make and use these devices and methods. The illustrated embodiments are, however, susceptible to modifications and alternative method steps from those discussed above that are fully equivalent. Consequently, the above described illustrated embodiments are not limited to the particular embodiments disclosed. On the contrary, they may encompass all modifications and alternative constructions and methods coming within the spirit and scope of the invention.

What is claimed is:

1. A method performed by a computer system having one or more processors and memory storing one or more programs for execution by the one or more processors, comprising:
   accessing one or more HTTP requests being identified as a particular webcrawler;
   detecting one or more IP addresses from the one or more HTTP requests;
   authenticating each detected IP address by associating it with a probability estimation regarding its association with the particular webcrawler, including:
      determining a first ratio of the one or more HTTP requests of a Classless Inter-Domain Routing (CIDR) block that are authenticated by round-trip DNS lookup; and
      determining a second ratio of IP addresses of the CIDR block that are associated with a request to the particular webcrawler;
   compiling a lookup table of each authenticated IP address in correlation with a confidence score indicating legitimacy of the particular webcrawler, the confidence score being contingent upon the probability estimation regarding association of the IP address with the particular webcrawler; and
   statistically aggregating into CIDR blocks each authenticated IP address.

2. A method as recited in claim 1 further including the step of determining if an IP address of an HTTP request to a webserver is from a legitimate webcrawler by cross referencing the IP address with the compiled lookup table of authenticated IP addresses.

3. A method as recited in claim 2 wherein internet sensors are used to access the one or more HTTP requests.

4. A method as recited in claim 2 wherein authenticating each detected IP address includes filtering malicious bots that spoof user agent strings used by legitimate webcrawlers.

5. A method as recited in claim 4 wherein authenticating each detected IP address includes the use of round-trip Domain Name Server (DNS) lookup tables.

6. A method as recited in claim 2 wherein authenticating each detected IP address includes:
   the use of heuristics based on density of IP addresses in CIDR blocks; and
   determining whether the CIDR block size is greater than a threshold block size.

7. A method as recited in claim 4 wherein authenticating each detected IP address includes the use of an Autonomous System Number (ASN) lookups.

8. A method as recited in claim 4 wherein authenticating each detected IP address includes cross-referencing against external open sources of crawler logs.

9. A method as recited in claim 1 further including updating the CIDR blocks having the statistically aggregated IP addresses at prescribed time periods.

10. A system for authenticating legitimate webcrawler IP addresses of HTTP requests, comprising:
   a memory;
   a processor disposed in communication with said memory, and configured to issue a plurality of instructions stored in the memory, wherein the instructions issue signals to:
      access one or more HTTP requests being identified as a particular webcrawler;

detect one or more IP addresses from the one or more HTTP requests;
authenticate each detected IP address by associating it with a probability estimation regarding its association with the particular webcrawler, including:
   determine a first ratio of the one or more HTTP requests of a Classless Inter-Domain Routing (CIDR) block that are authenticated by round-trip DNS look-up; and
   determine a second ratio of IP addresses of the CIDR block that are associated with a request to the particular webcrawler;
compile a lookup table of each authenticated IP address in correlation with a confidence score indicating legitimacy of the particular webcrawler, the confidence score being contingent upon the probability estimation regarding association of the IP address with the particular webcrawler; and
   issue signals to statistically aggregate into CIDR blocks each authenticated IP address.

11. A system as recited in claim 10 wherein the processor is further configured to issue signals to determine if an IP address of an HTTP request to a webserver is from a legitimate webcrawler by cross referencing the IP address with the compiled lookup table of authenticated IP addresses.

12. A system as recited in claim 11 wherein internet sensors are used to access the one or more HTTP requests.

13. A system as recited in claim 11 wherein the processor is further configured to issue signals to filter malicious bots that spoof user agent strings used by legitimate webcrawlers.

14. A system as recited in claim 13 wherein each detected IP address is authenticated via the use of round-trip Domain Name Server (DNS) lookup tables.

15. A system as recited in claim 13 wherein each detected IP address is authenticated via the use of heuristics based on density of IP addresses in CIDR blocks and depends on whether the CIDR block size is greater than a threshold block size.

16. A system as recited in claim 13 wherein each detected IP address is authenticated via the use of Autonomous System Number (ASN) lookups.

17. A system as recited in claim 10 wherein the processor is further configured to issue signals to update the CIDR blocks having the statistically aggregated IP addresses at prescribed time periods.

18. A non-transitory computer readable storage medium and one or more computer programs embedded therein, the computer programs comprising instructions, which when executed by a computer system, cause the computer system to:
access one or more HTTP requests being identified as a particular webcrawler;
detect one or more IP addresses from the one or more HTTP requests;
authenticate each detected IP address by associating it with a probability estimation regarding its association with the particular webcrawler, including:
   determine a first ratio of the one or more HTTP requests of a CIDR block that are authenticated by round-trip DNS look-up; and
   determine a second ratio of IP addresses of the CIDR block that are associated with a request to the webcrawler; and
compile a lookup table of each authenticated IP address in correlation with a confidence score indicating legitimacy of the particular webcrawler, the confidence score being contingent upon the probability estimation regarding its association of the IP address with the particular webcrawler, wherein each authenticated IP address is statistically aggregated into CIDR blocks.

* * * * *